March 3, 1970    W. H. RYMES    3,499,113
CATHODE-RAY TUBE SCALE MARKER

Filed Nov. 21, 1966    2 Sheets-Sheet 1

INVENTOR.
WILLIAM H. RYMES

United States Patent Office 3,499,113
Patented Mar. 3, 1970

3,499,113
CATHODE-RAY TUBE SCALE MARKER
William H. Rymes, 2415 N. Florida St.,
Arlington, Va. 22207
Filed Nov. 21, 1966, Ser. No. 596,015
Int. Cl. H01j 29/34
U.S. Cl. 178—7.83                      2 Claims

ABSTRACT OF THE DISCLOSURE

A means for presenting a desired scale or indicia on the face of a cathode-ray tube. This is accomplished by providing various scale or indicia markers as part of the neck of the cathode ray tube and includes electronic means for activating the desired scale or indicia. In addition apparatus is provided for making a permanent record of the data presented on the cathode ray tube including said scale or indicia.

---

The invention described herein may be manufactured and used by or for the Government of the United States of America for governmental purposes without the payment of any royalties thereon or therefor.

The present invention relates to cathode-ray tubes, and more particularly to means presenting a desired scale or indicia to an observer in order to facilitate an assessment and/or evaluation of data depicted by the patterns traced on the fluorescent screen of the tube by the electron scanning beam.

At the present time, patterns or images developed on the fluorescent screen or a cathode-ray tube are customarily viewed by an operator through a transparency on which appears one or more scales, or reference markers, upon which the pattern is in effect superimposed for presentation to an observer. This transparency is commonly positioned on or closely adjacent to the protective glass cover which encloses the cathode-ray tube and which is designed to prevent injury to operating personnel in the event that the cathode-ray tube should shatter or implode. Inasmuch as this protective glass plate or cover must be physically displaced from the outer surface of the cathode-ray tube end wall (in practice by approximately ⅝ to ¾ inch) it is obvious that a problem of parallax arises, and, to reduce this undesired factor to a minimum, the operator normally should maintain a point of observation which substends as small an angle as possible with a line-of-sight parallel to the principal axis of the cathode-ray tube. Unfortunately, this is not always practicable, and consequently errors are introduced into the readings obtained. Furthermore, inasmuch as the data presented on the screen of the cathode-ray tube may represent a number of different functions, no single scale is suitable under all conditions. Hence, the transparency normally has formed thereon a plurality of indicia one of which is mentally selected by the operator for visual association with the information being displayed. An alternative is to have available a plurality of different transparencies corresponding in number to the types of data being developed by the cathode-ray tube, but this obviously requires constant replacement of one transparency by another, and such an expedient is often impracticable especially if the data varies rapidly. Moreover, in many cases the cathode-ray tube assembly is so designed that the reference indicia are fixed in position and cannot be readily removed.

At the present time, therefore, a serious problem exists in equipment employing cathode-ray tubes where an assessment or evaluation of the presented data is necessary, such, for example, as in the case of airborne fire-control radars and underwater sonar systems. When operating such apparatus, numerous reference markers are required to properly evaluate all of the data capable of being presented. It would consequently be desirable to have available some arrangement in which only one particular scale or set of indicia is visually presented to an operator at any particular instant of time, and, furthermore, with such scale or presentation being essentially coincident in axial position with the developed trace so that the problem at parallax is either overcome entirely or materially reduced. It would be even more desirable to have the proper scale or presentation automatically become visible when the apparatus of which the cathode-ray tube forms a part is manually controlled so as to select a particular function from a plurality of data signals which are available. It is an objective of the present invention to provide such an arrangement.

In accordance with a feature of the present concept, an observer viewing the screen of a cathode-ray tube is provided with means for assessing the data presented thereon without the introduction of errors due to parallax and without the possibility of confusion due to an incorrect association of such data with other than the proper scale or set of reference indicia. Furthermore, the particular scale presented at any one instant of time is automatically selected so that the scanning beam of the cathode-ray tube develops on the fluorescent screen a pattern for which that particular scale has been developed. Still further, means are provided for making a permanent record of the data presented on the screen of the cathode-ray tube over a period of time so that this data is subsequently available for evaluation and/or analysis.

One object of the present invention, therefore, is to provide auxiliary equipment for a cathode-ray tube in which a set of reference markers is developed in axial coincidence with the luminous trace representing data to be evaluated.

A further object of the invention is to provide a scale for evaluating data developed on the fluorescent screen of a cathode-ray tube, this scale being so associated with the developed data that the problem of parallax is not present.

A still further object of the invention is to provide a plurality of scales capable of being individually and selectively projected through the side wall of a cathode-ray tube so that they appear in axial coincidence with the trace developed on the tube's fluorescent screen by the electron scanning beam.

An additional object of the invention is to provide apparatus for making a permanent record of data presented on the fluorescent screen of a cathode-ray tube without the necessity of positioning such apparatus is front of the tube where it might interfere with the manipulation of the tube controls and/or lie in the line-of-sight between the cathode-ray tube screen and the eye of an observer.

Other object, advantages, and novel features of the invention will become apparent from the following detailed description of the invention when considered in conjunction with the accompanying drawings, wherein:

FIG. 1 is a cross-sectional view of a cathode-ray tube on the fluorescent screen of which data is to be displayed, also showing a sheet of protective glass located in front of the cathode-ray tube together with an adjacent transparency positioned adjacent the protective glass in a manner now known in the art, the transparency being designed with one or more scales or indicia thereon so that the data displayed upon the screen of the cathode-ray tube may be readily assessed or evaluated;

Figure 4:
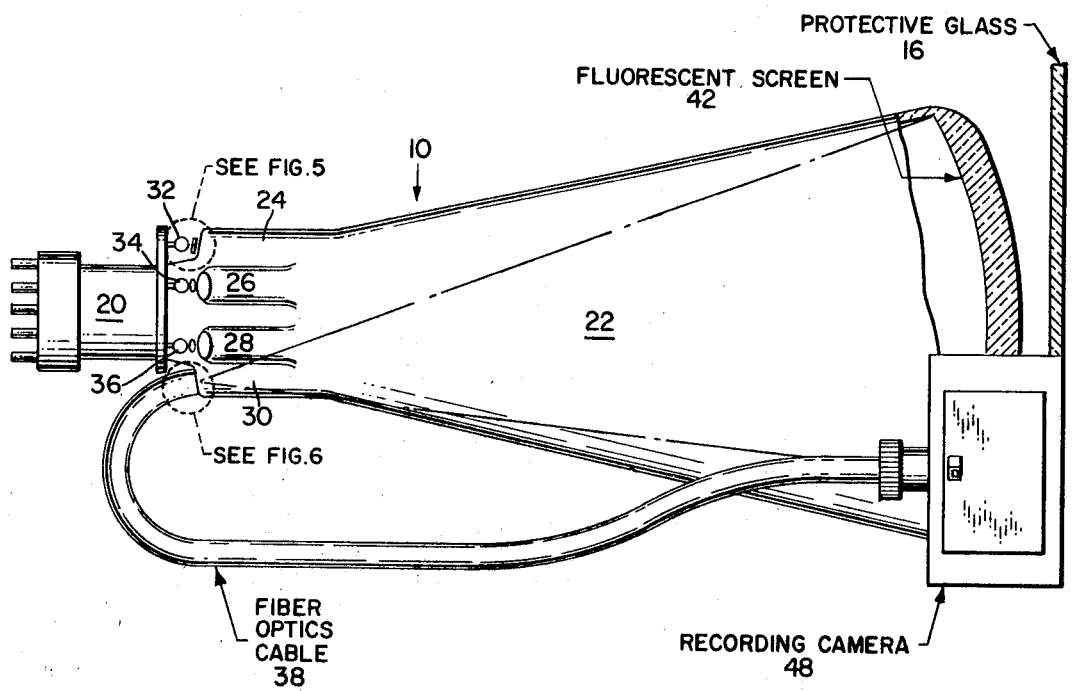
FIG. 4 is a side view, partly in section, of the cathode-ray tube of FIG. 3 together with certain of its associated components.
Figure 5:
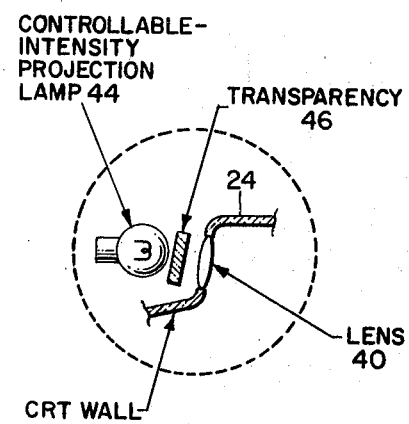
Figure 6:
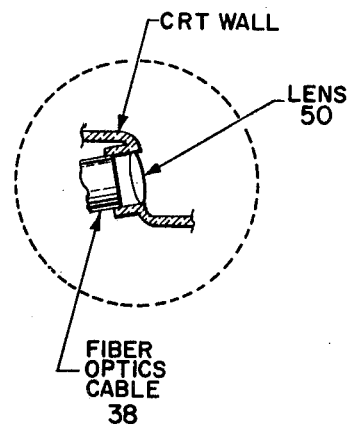

FIG. 5 is an enlarged view, partly in section, of a portion of FIG. 4, illustrating the manner in which a desired pattern or scale is optically projected toward the inner surface of the fluorescent screen of the cathode-ray tube; and FIG. 6 is an enlarged view, partly in section, of another portion of FIG. 4, showing the manner in which light representing the image developed on the fluorescent screen of the cathode-ray tube of FIG. 4 may be picked up and conducted to some form of recording medium.

Figure 1:
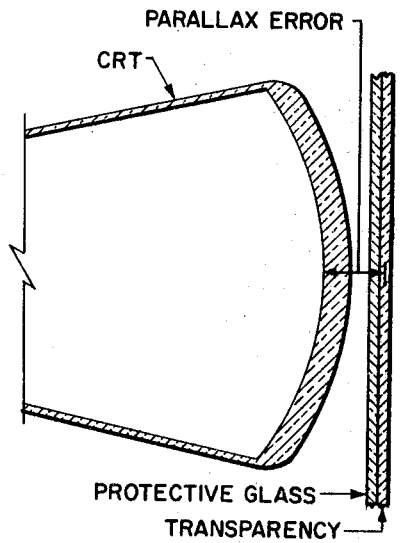
Figure 2:
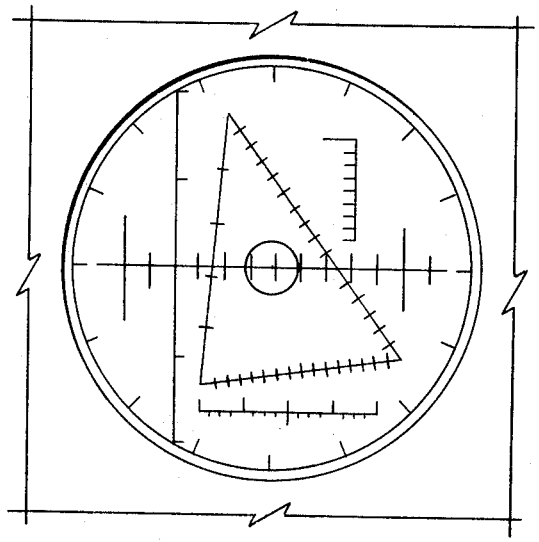
FIG. 2 is a front or face view of a portion of the panel of an electronic instrument within which the cathode-ray tube of FIG. 1 is located, FIG. 2 also illustrating the conventional manner in which a plurality of scales or other indicia are formed on the transparency of FIG. 1 so as to be presented to an observer viewing the cathode-ray tube screen therethrough.

Referring first to FIGURES 1 and 2 of the drawings, there is shown a cathode-ray tube associated with some form of electronic instrument now known in the prior art such, for example, as an oscilloscope or a fire-control radar display device. It is standard practice in such circumstances to provide a single transparency associated with the cathode-ray tube and disposed on, or adjacent to, the protective glass plate which shields the tube from an observer and consequently prevents injury to such individual in the event that the tube shatters or is otherwise destroyed while the observer is in the immediate vicinity thereof. As will be noted from FIG. 1, the transparency is physically displaced from the outer surface of the cathode-ray tube end wall by an amount which, in practice, varies between ⅝ and ¾ inch. Consequently, unless the observer views a portion of the cathode-ray tube screen along a line-of-sight which is essentially parallel to the longitudinal axis of the cathode-ray tube, a parallax error is introduced which becomes more serious as the viewing angle increases. This often results in misleading or inaccurate data and has, up to the present time, presented a serious problem in devices of this nature. Furthermore, the transparency of FIG. 1 is usually formed with a plurality of scales thereon, as shown in FIG. 2, and the operator must mentally select a proper scale for association with any particular type of data being presented on the tube screen at any instant of time. In other words, each scale is to be associated with a particular function of the apparatus of which the cathode-ray tube forms a part, and, since all the scales are simultaneously displayed or visible to the operator, considerable confusion is introduced in that the scales not being employed are still before the eye of the operator. It would be highly desirable to have visible at any one instant of time only that particular scale which is properly associated with the type of data that is then being displayed on the fluorescent screen of the cathode-ray tube.

Figure 3:
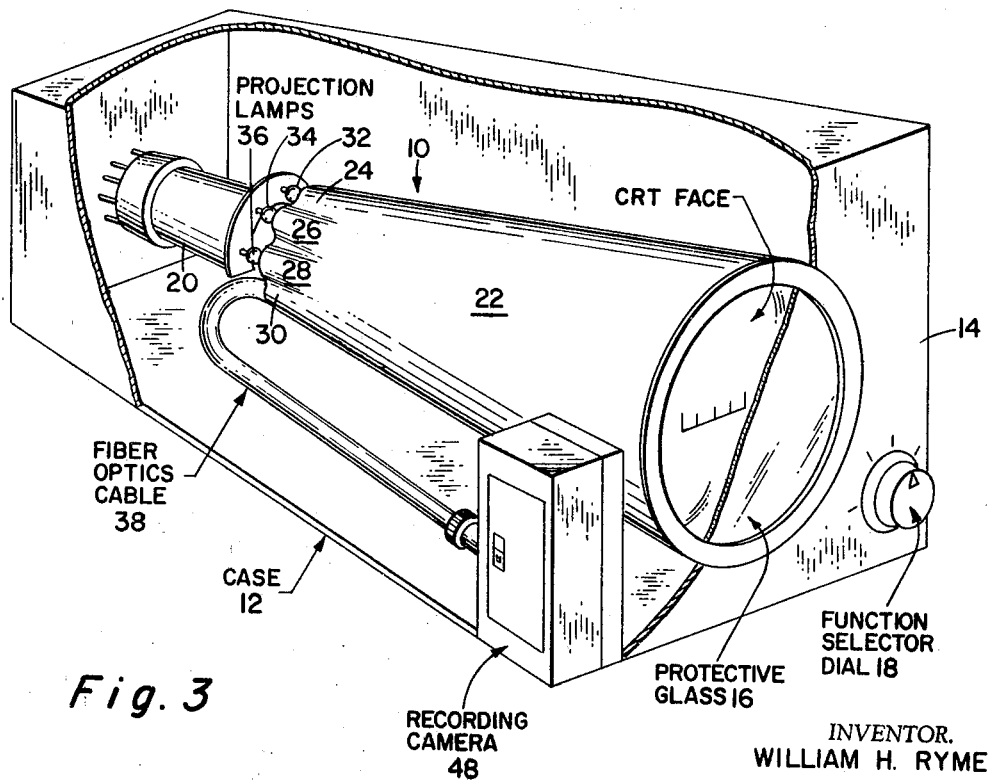
FIG. 3 is a perspective view, partially broken away, of an electronic instrument such as illustrated in FIG. 2 but without the transparency of FIG. 1, FIG. 2 also including a cathode-ray tube designed in accordance with a preferred embodiment of the present invention.

In FIGURE 3 of the drawings there is illustrated a preferred arrangement incorporating the principles of applicant's invention. A cathode-ray tube 10, of a design to be subsequently described, in enclosed within a case or cabinet 12. The means for supporting tube 10 within case 12 form no part of the present invention, and such means has consequently been omitted from the drawing for the sake of clarity. The front panel 14 of the case 12 has a circular opening, as shown, through which the screen of the cathode ray tube 10 is visible, this opening being covered by a protective glass plate 16 which may be of a type similar to that shown in FIG. 1 of the drawings. Also on the front panel 14 of the case 12 is a function selector dial 18, and, by manual manipulation of this dial 18, any particular one of a plurality of different functions may be displayed by the electron scanning beam upon the fluorescent screen of the cathode ray tube 10. These functions, for example, may include such data (for an airborne fire-control radar) as target range, target range rate, target bearing, and so on. However, this is purely exemplary, and many other functions or data are obviously capable of being displayed upon a cathode-ray tube of this nature.

It will be noted that in FIG. 3 of the drawings there is no transparency associated with the protective glass plate 16, as is the case with the prior art arrangement of FIGURES 1 and 2 of the drawings. In place of such a transparency, the present concept contemplates the development of a single scale (or set of related indicia) at any one instant of time, such scale or indicia being optically projected toward the fluorescent screen of the cathode-ray tube 10 from a point toward the rear of the tube and with the light rays representative of such scale passing through a portion of the cathode-ray tube side wall. The means for producing such a result will now be described in connection with FIGURES 3 through 6 of the drawings.

The cathode-ray tube 10 of FIGURES 3 and 4 is made up of a conventional tubular neck portion 20 and a flared bulb portion 22, which is also mainly of standard configuration. However, that portion of the cathode-ray tube 10 in the region where the neck portion 20 is joined to the bulk portion 22 is modified so as to provide a plurality of individual radially-enlarged wall portions equally-spaced circumferentially about the tube. Each such individual radially-enlarged tube wall portion is of modified cylindrical form, with an axis extending essentially parallel to the longitudinal axis of the cathode-ray tube and with a rear end section lying in a plane essentially transverse to such tube axis. In FIGURES 3 and 4 of the drawings, those particular ones of such individual radially-enlarged wall portions that are visible are identified by the reference numerals 24, 26, 28 and 30, respectively. With a single exception, each of these radially-enlarged wall portions is associated with a controllable-intensity projection lamp. For example, the wall portion 24 is associated with a lamp 32, the wall portion 26 with a lamp 34, and the wall portion 28 with a lamp 36. The remaining wall portions not visible in FIGURES 3 and 4 of the drawings are similarly provided with projection lamps, so that, out of a total, say, six wall portions, five are arranged in a manner such as shown in detail in FIGURE 5 of the drawing. However, the remaining wall portion 30, as best shown in FIG. 6 of the drawings, has leading thereto a cable 38 of the fiber optics type.

It will be appreciated that the rearmost region of each of the individual radially-enlarged wall portions (such as 24, 26 and 28) has an essentially flat or planar surface lying essentially transverse to the longitudinal axis of the cathode-ray tube 10. In accordance with a feature of applicant's invention, an opening is formed in each such planar portion, and a lens (such as indicated by the reference numeral 40 in FIG. 5) is inserted in this opening in the manner illustrated. Consequently, light passing through this lens 40 from exterior of the cathode-ray tube may, if the lens 40 is properly chosen, be focused upon the fluorescent screen 42 of the cathode-ray tube. If this light emanates from the controllable-intensity projection lamp 44, and if a transparency 46 be interposed between the lamp 44 and the lens 40, then any scale or indicia etched (or otherwise formed) upon the transparency 46 will be projected onto the fluorescent screen 42.

If each of the wall portions 24, 26, 28, etc. (with the exception of the wall portion 30) be provided with its own controllable-intensity projection lamp and with its own transparency, then it will be apparent that selective energization of any of the lamps 32, 34, 36, etc., will cause to be projected upon the fluorescent screen 42 that particular image which is etched or otherwise impressed upon the transparency associated with the lamp thus energized. A number of scales or indicia (up to five in the example being given) can thus be selectively projected upon the fluorescent screen 42, and will be visible to an observer viewing the screen of the tube through the protective glass 16. In accordance with the description hereinabove given, the various scales or indicia thus capable of being projected through the respective lenses 40 may be associated with various functions of the apparatus of which the cathode ray tube forms a part. It will be readily appreciated that the selective energization of the various projection lamps (such as 44 in FIG. 5) may be carried out concurrently with the selection of a particular equipment function by the operator of the apparatus through manipulation of the dial 18. Obviously, selection of a particular function to be displayed by the electron scanning beam may concurrently result in energization of one of the lamps 32, 34, etc., so as to project onto the fluorescent screen 42 the proper scale to be associated with the display. As above brought out, no problem of parallax arises, and, furthermore, since the multi-scaler transparency of prior art FIGURES 1 and 2 is not interposed between the observer and the fluorescent screen of the cathode-ray tube, the image as viewed by the observer appears brighter and more distinct, and very weak signals may be detected under circumstances where the light therefrom would be insufficient to pass through the transparency of FIGURES 1 and 2.

In many instances it is desirable to make a permanent record of the data displayed upon the fluorescent screen of the cathode-ray tube 10. In the case of an airborne fire-control radar, for example, it is often advantageous to be able to play back the presented data for post-flight review and assessment so that the tactical aspects of a particular mission may be evaluated. At the present time, radar activity during a mission is recorded by mounting a camera (and a camera adaptor) close to the face of the cathode-ray tube, with a semi-transparent glass plate positioned at an angle so that the image developed on the cathode-ray tube screen is not only transmitted directly to an observer, but also reflected at an angle towards the lens of the camera. Such an arrangement has a number of objectionable characteristics in that the presence of the camera and its associated equipment precludes the manipulation of the radar controls in a convenient manner and also attenuates the image in that a portion of the light developed by the cathode-ray scanning beam does not reach the observer but is reflected toward the camera.

In accordance with an additional feature of the present invention, the image displayed upon the fluorescent screen 42 of the cathode-ray tube of FIGURES 3 and 4 is photographed from the rear of the tube rather than from the front thereof. This is accomplished by means which includes the fiber optics cable 38 of FIGURES 3 and 4, which leads from a point near the tube wall portion 30 (see FIG. 6) to a recording camera 48 located within the case 12 (see especially FIG. 3). This recording camera 48 may be of any conventional type capable of receiving light transmitted through the cable 38, which light is representative of the image developed on the fluorescent screen 42.

FIG. 6 of the drawings indicates the manner in which a lens 50 picks up light representing the image developed on the cathode-ray tube screen and focuses such light onto a terminal portion of the cable 38. The camera 48 thus "sees" both the trace developed by the cathode-ray scanning beam and also the particular scalar representation produced by energization of any particular one of the lamps 32, 34, 36 etc. With the disclosed arrangement, the usual external camera may be dispensed with, and the full brightness of the cathode-ray tube display is available for recording. In effect, therefore, a terminal end of the fiber optics cable 38 replaces the lamp 44 and the transparency 46 of FIG. 5, and instead of light being transmitted through the lens 40 into the cathode-ray tube from a source exterior thereof, the arrangement of FIG. 6 picks up light developed within the cathode-ray tube and transmits it to the exterior fiber optics cable 38.

It is contemplated that the individual transparencies associated with the cathode-ray tube 10 (such, for example, as the transparency 46 in FIG. 5) may be of different colors, thereby denoting to an observer that the reference markers developed in any particular color are to be identified with a specific function of the apparatus of which the cathode-ray tube forms a part. In this manner, assessment of such specific function is facilitated by comparison with a system in which all of the indicia have the same chromaticity characteristics. It will also be appreciated that the intensity of illumination of any one of the lamps 32, 34, 36 etc. may be readily controlled so as not to produce scales of such brilliance as to obscure the data traced by the cathode-ray beam. However, such an expedient will readily suggest itself to those skilled in the art to which the present invention pertains.

Obviously many modifications and variations of the present invention are possible in the light of the above teachings. It is therefore to be understood that within the scope of the appended claims the invention may be practiced otherwise than as specifically described.

I claim:

1. Apparatus for providing, to an observer of an image developed on the fluorescent screen of a cathode-ray tube by the electron scanning beam thereof, a scale by means of which at least one characteristic of such image may be evaluated without the introduction of errors into such evaluation due to the longitudinal displacement of such scale from the fluorescent screen of said cathode-ray tube upon which such image is developed, said apparatus comprising:

a plurality of selectively-energizable light sources spaced apart circumferentially about said cathode-ray tube in the region where the neck intersects the flared bulb portion thereof;

a plurality of transparencies equal in number to the number of light sources and respectively associated therewith, each such transparency containing thereon a scale useful in evaluating an image developed by the scanning beam of said cathode-ray tube and with the scale on each transparency being different from the scale on all remaining transparencies;

said cathode-ray tube wall, in the region where the neck intersects the flared bulb portion thereof, being provided with a plurality of radially-extending projections equal in number to the number of said light sources, with each radially extending wall projection having an essentially circular aperture formed therein designed to receive an optical lens;

a plurality of optical lenses respectively receivable in said cathode-ray tube wall apertures so that the plane of each lens lies essentially transverse to the longitudinal axis of the cathode-ray tube;

each of said transparencies being respectively interposed between the particular light source and lens with which it is associated, and with each of said lenses being arranged to project to a focus on the fluorescent screen of said cathode-ray tube the light from its associated source which has passed through a transparency, so that, upon selective energization of a light source, a replica of the scale contained on the transparency associated therewith is formed on said fluorescent screen and is visible to said observer along with an image which may be developed by said scanning beam without the introduction of any parallax between said image and said scalar replica;

a fiber optics cable exterior of said cathode ray tube and replacing one of said light sources and its associated transparency, one extremity of said cable lying in the focal plane of the lens associated with the replaced light source; and a camera located at the other extremity of said cable and arranged to photograph the fluorescent screen of said cathode-ray tube as seen by said lens.

2. Apparatus for providing, to an observer of an image developed on the fluorescent screen of a cathode-ray tube by the electron scanning beam thereof, indicia by means of which a plurality of characteristics of such image may be selectively evaluated without the introduction of errors into such evaluation due to the longitudinal displacement of such indicia from the fluorescent screen of said cathode-ray tube upon which such image is developed, said apparatus comprising:

- a plurality of lenses positioned in spaced-apart relationship around the periphery of the cathode-ray tube neck portion, each of said lenses forming in effect a portion of the wall of said tube;
- a plurality of selectively-energizable light sources equal in number to said lenses and respectively associated therewith, said light sources being external to said cathode-ray tube;
- a plurality of transparencies equal in number to said lenses and light sources and respectively associated therewith, each transparency having an indica formed thereon and being positioned intermediate one particular light source and lens so as to receive light from such source and to pass light representative of said indicia through such lens;
- whereby selective energization of any one of said light sources will cause the light passing through its associated transparency to be directed by its associated lens to a focus on said fluorescent screen, so that there will appear on such screen a replica of the indicia formed on such transparency, said replica being in positional coincidence with the image developed by said electron scanning beam insofar as the longitudinal axis of said cathode-ray tube is concerned;
- a camera exterior to said cathode-ray tube;
- means for directing light representative of the indicia appearing on the fluorescent screen of said cathode-ray tube through the wall of the latter to a focus in a plane exterior of said tube;
- a fiber optics bundle exterior of said tube for conveying the light so focused to said camera to be photographically recorded thereby; and
- means operable by an observer of the image developed by said scanning beam on said fluorescent screen for selecting for concurrent display therewith an indica selected from said plurality which is appropriate to the evaluation of the particular image being developed.

References Cited

UNITED STATES PATENTS 3,384,712   5/1968   Gruen _____ 178—7.5
3,360,670   12/1967  Manning.

ROBERT L. GRIFFIN, Primary Examiner

BARRY L. LEIBOWITZ, Assistant Examiner

U.S. Cl. X.R.

178—6, 7.85